Feb. 6, 1940. M. E. BOWDISH 2,189,391
VEHICLE AIR CONDITIONER
Original Filed May 13, 1937    2 Sheets-Sheet 2
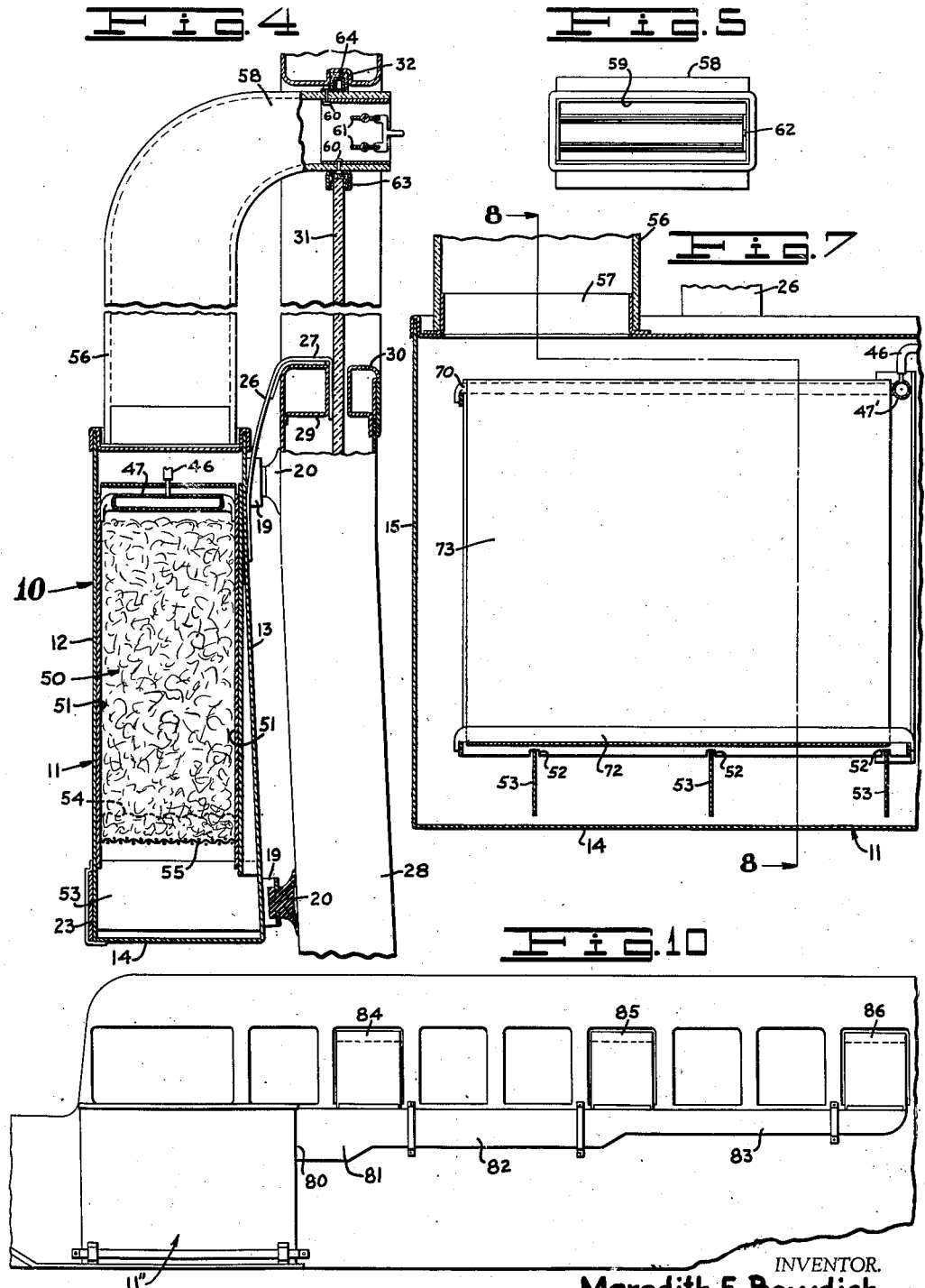
INVENTOR.
Meredith E. Bowdish.
BY
ATTORNEY.

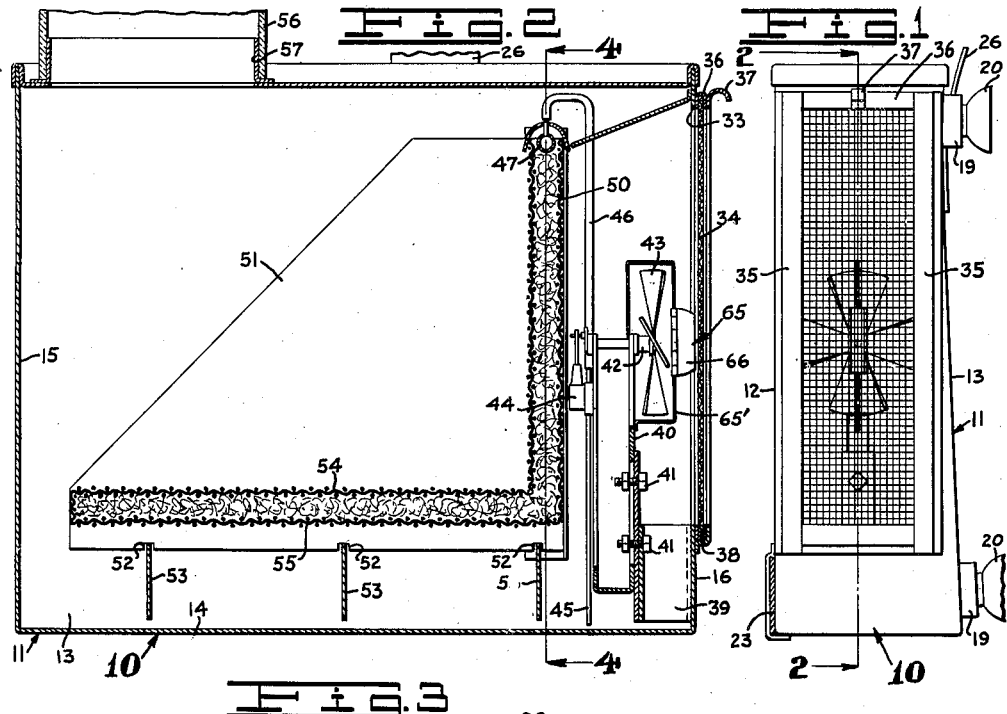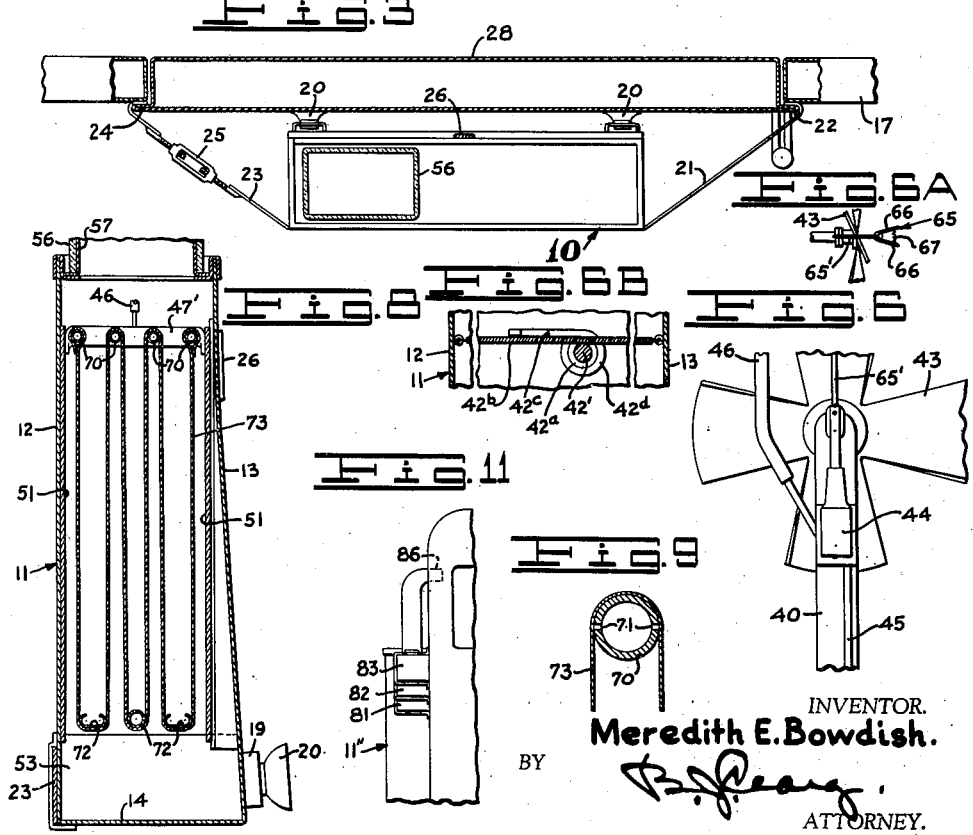

Patented Feb. 6, 1940

2,189,391

UNITED STATES PATENT OFFICE 2,189,391

VEHICLE AIR CONDITIONER

Meredith E. Bowdish, Venice, Calif., assignor to William H. Fabry, Alhambra, Calif.

Application May 13, 1937, Serial No. 142,388
Renewed July 7, 1939

8 Claims. (Cl. 261—35)

This invention relates to vehicle air conditioner.

The general object of the invention is to provide an improved air conditioner which includes means to circulate the fluid and wherein the fluid circulation means is operated by the air stream.

A more specific object of the invention is to provide means for cooling a motor vehicle by causing air to be passed thereinto and wherein the air is treated by means operated by a column of air.

Other objects and the advantages of my invention will be apparent from the following description taken in connection with the accompanying drawings, wherein:

Fig. 1 is a front elevation showing my improved vehicle air conditioner;

Fig. 2 is a section taken on line 2—2 Fig. 1;

Fig. 3 is a horizontal sectional view through a portion of the vehicle showing my air conditioner attached thereto;

Fig. 4 is a section taken on line 4—4 Fig. 2;

Fig. 5 is a front view of the air discharge member;

Fig. 6 is a fragmentary elevation showing the impeller and pump;

Fig. 6A is a fragmentary front elevation showing the fan control member;

Fig. 6B is a fragmentary sectional view showing a modified type of fan control member;

Fig. 7 is a view similar to Fig. 1 showing a modification of my invention;

Fig. 8 is a section taken on line 8—8 Fig. 7;

Fig. 9 is an enlarged section showing the fabric strip support;

Fig. 10 is a fragmentary side elevation showing a further modification of my invention mounted on a bus, and Fig. 11 is a fragmentary rear view of the bus shown in Fig. 10.

Referring to the drawings by reference characters I have shown my invention as embodied in a vehicle air conditioner which is indicated generally at 10. As shown the conditioner comprises a housing 11 which includes sides 12 and 13, a bottom 14, a rear 15 and a front 16. The housing is preferably made of suitable weight of sheet metal and the housing preferably flares downwardly in width as shown in Figs. 1 and 4 of the drawings.

A vehicle is indicated fragmentarily at 17 and in the drawings I show my invention as applied to the vehicle door. The housing side 13 is provided with brackets 19 which support rubber suction cups 20 which grasp the outer surface 18 of the door and thus serve to hold the housing 11 in position. The housing further includes a front strip member 21 which is attached at one end of the housing and at the other end engages behind the flange 22 on the door as shown in Fig. 3. Another strip member 23 engages behind the flange 24 of the door. This strip member 23 preferably includes a turnbuckle 25 by means of which effective adjustment may be secured. The suction cups 20 and the strips 21 and 23 serve to prevent lateral and front internal movement of the housing while the principal weight of the housing and associated parts is carried by a support member 26 which is secured to the side 13 of the housing at one end and the other end of which is bent over as at 27 to engage the top of the vehicle door 28.

The door 28 is of the type which includes upper members 29 and 30 which provide a space between which a glass window 31 may be raised causing it to move into a slot 32 as clearly shown in Fig. 4 of the drawings.

The housing includes a front having an opening 33 therein which is closed by a screen member 34 which is slidable beneath flanges 35 and which includes a top member 36 having a handle 37 and a bottom 38. Mounted within the housing adjacent the screen 34 I show a bracket 39 which is engaged by a U-shaped support 40 which is held in place by bolts 41. The support 40 supports an impeller 42 having fan blades 43.

These fan blades are adapted to operate a pump 44 which includes an inlet pipe 45 disposed near the bottom of the housing and which includes an outlet 46 which extends upwardly. The outlet 46 preferably comprises a rubber hose which is connected to a header 47 as shown in Fig. 2. The details of the impeller and pump form no part of the present invention. The header 47 is provided with apertures which discharge water therefrom downwardly and this header is arranged in the upper end of a moistening member 50. This moistening member includes side plates 51 which have notches 52 thereon in the bottom thereof to fit over fabric members 53 which extend from one side of the housing to the other and which are spaced above the bottom of the housing as shown in Fig. 2. The moistening member is provided with mesh members 54 and 55 which are L-shaped and which are spaced apart and which are filled with excelsior or other water absorbing material. The header discharges the water from the pump onto this material and maintains it in moist condition.

The housing is provided with an outlet 56 in its top which is fitted over a collar 57 and the outlet preferably contracts in cross area into an elbow portion 58 which is provided with an internal sleeve 59 shown as held in place by rivets 60. This member 59 includes pivoted louvres 61 adapted to be rocked by an operating member 62 to control discharge from the outlet. The elbow member includes a downwardly facing U-shaped support member 63 which engages over the top of the shiftable window glass 31 and is also provided with a tongue member 64 which fits in a groove 32 of the window frame so that the discharge member is held against movement.

In operation the air conditioner is mounted on a vehicle with the mesh screen member 34 facing forwardly so that the column of air created by the passage of the automobile passes through the screen member and also through the housing and through the water moistening member therein and is discharged through the outlet 58. The air is moistened and consequently cooled by its passage through the moistening member and in order to replenish moisture from the moistening member the fan 43 lifts the water from the bottom of the tank and discharges it onto the moistening material whence such water as is not entrained with the column of air passes to the bottom of the housing where it again circulates.

To prevent speeding of the impeller 43 when the vehicle travels fast I provide a control device 65 (see Figs. 2 and 6A). This device is mounted on a bracket 65' and includes a pair of flaps 66 which are held together with a spring 67. The flaps 66 are mounted in front of the impeller and when the column of air increases in speed these flaps are opened by the air current thus lessening the amount of air which strikes the impeller 43.

In Fig. 6B I show a modification of the speed control mechanism wherein the impeller shaft 42' is provided with a friction sleeve 42A. The housing includes a transverse spring 42B which engages an arm 42C. This arm 42C includes a collar 42D which engages the sleeve 42A. The construction is such that as the speed of the shaft 42' increases the arm of the collar 42A which slightly engages the shaft tends to rotate thus tending to rotate the arm 42C thus pulling down on the spring 42B. The spring engages the shaft 42' and thus serves as a brake to reduce the speed of the shaft.

In Figs. 7, 8 and 9 I show a modification of my invention wherein the housing is similar to that described and includes a header 47' which discharges into a plurality of transverse headers 70. These transverse headers 70 as shown in Fig. 9 include outlets 71. Below the transverse are supports 72 and over the header 70 and support 72 I arrange an endless fabric strip 73 which is moistened by the water passing through the header 47 and into the header 70 and thence to the aperture 71. These cloth strips serve as water moistening members and their operation is similar to that of the moistening member 50.

In Figs. 10 and 11 I show a further modification of my invention wherein the housing 11" is provided with a moistening member such as that shown in Fig. 1 and is provided with an outlet member 80 in the rear end thereof instead of in the top surface. This outlet member includes a front portion 81 of large cross section area, an intermediate portion 82 of less area and a rear portion 83 of still less area and along this outlet member I provide discharge members 84, 85 and 86 which are similar in all respects to the discharge members 58 previously described. By making the outlet 80 of decreasing section I provide in effect a guide which insures passage of air into each of the outlets.

From the foregoing description it will be apparent that I have invented a novel vehicle air conditioner which can be economically manufactured and which is highly efficient in use.

Having thus described my invention I claim:

1. In a vehicle air conditioner, a housing, a plurality of transversally extending baffle members in said housing and spaced from the bottom thereof, an air moistening unit in said housing, said unit including spaced wire mesh members forming a pocket, water absorbing material in said pocket, said housing having an open front, a header at the top of said unit, means to supply water to said header, said header having discharge apertures therein, said housing having an outlet including an elbow portion, means to control flow of air through said elbow portion, said elbow portion having a grooved member thereon adapted to engage the top of a window glass and also having a tongue adapted to fit within a window frame groove.

2. In a vehicle air conditioner, a housing having a plurality of suction cups thereon adapted to engage the outside of the door of a motor vehicle, said housing having a pair of straps thereon, said straps having hooked end portions adapted to engage the front and rear flanges on a vehicle door, one of said flaps including a turnbuckle, a supporting strap at the top of said housing, said supporting strap having a hook adapted to fit within the window slot of an automobile door. said housing having an outlet including an elbow portion, means to control flow of air through said elbow portion, said elbow portion having a grooved member thereon adapted to engage the top of a window glass and also having a tongue adapted to fit within a window frame groove.

3. In a vehicle air conditioner, a housing, means to hold said housing on a motor vehicle, an air moistening unit in said housing, said unit including mesh members forming a pocket, water absorbing material in said pocket, said housing having an open front, an impeller mounted in the housing in advance of said moistening unit, a pump connected to said impeller, said pump including an inlet disposed adjacent the bottom of said receptacle, said pump having an outlet, a header at the top of said unit and communicating with said outlet, said header having discharge apertures therein, said housing having an outlet including an elbow portion, said elbow portion having a grooved member thereon adapted to engage the top of a window glass and also having a tongue adapted to fit within a window frame groove.

4. In a vehicle air conditioner, a housing, means to hold said housing on a motor vehicle, an air moistening unit in said housing, said unit comprising side plates having spaced wire mesh members in L-shape and extending from one plate to the other forming a pocket, water absorbing material in said pocket, said housing having an open front, an impeller mounted in the housing in advance of said moistening unit, a pump connected to said impeller, said pump including an inlet disposed adjacent the bottom of said housing, said pump having an outlet, a header at the top of said unit and communicating with said outlet, said header having discharge apertures therein, said housing having an outlet including an elbow portion, means to control flow of air through said elbow portion, said elbow portion having a grooved member thereon adapted to engage the top of a window glass and also having a tongue adapted to fit within a window frame groove.

5. In a vehicle air conditioner, a housing having a plurality of suction cups thereon adapted to engage the outside of the door of a motor vehicle, said housing having straps thereon adapted to engage a vehicle door, a plurality of transversely extending baffle members in said housing and spaced from the bottom thereof, an air moistening unit in said housing, said unit comprising side plates having spaced wire mesh members in L-shape and extending from one plate to the other forming a pocket, water absorbing material in said pocket, said housing having an open front, a slidable screen closure in said open front, an impeller mounted in the rear of said screen and in advance of said moistening unit, a pump connected to said impeller, said pump including an inlet disposed adjacent the bottom of said tank, said pump having an outlet, a header at the top of said unit and communicating with said outlet, said header having discharge apertures therein, said housing having an outlet.

6. In a vehicle air conditioner, a housing having a plurality of suction cups thereon adapted to engage the outside of the door of a motor vehicle, said housing having a pair of straps thereon, said straps having hooked end portions adapted to engage the front and rear flanges on a vehicle door, one of said flaps including a turnbuckle, a supporting strap at the top of said housing, said supporting strap having a hook adapted to fit within the window slot of an automobile door, a plurality of transversally extending baffle members in said housing and spaced from the bottom thereof, an air moistening unit in said housing, said unit comprising side plates having spaced wire mesh members in L-shape and extending from one plate to the other forming a pocket, water absorbing material in said pocket, said housing having an open front, a slidable screen closure in said open front, an impeller mounted in the rear of said screen and in advance of said moistening unit, a pump connected to said impeller, said pump including an inlet disposed adjacent the bottom of said tank, said pump having an outlet, a header at the top of said unit and communicating with said outlet, said header having discharge apertures therein, said housing having an outlet including an elbow portion, means to control flow of air through said elbow portion, said elbow portion having a grooved member thereon adapted to engage the top of a window glass and also having a tongue adapted to fit within a window frame groove.

7. In a vehicle air conditioner, a housing having a plurality of suction cups thereon adapted to engage the outside of the door of a motor vehicle, said housing having a pair of straps thereon adapted to engage a vehicle, one of said flaps including tightening means, said housing having an outlet including an elbow portion and means to control flow of air through said elbow portion.

8. In a vehicle air conditioner, a housing adapted to engage the door of a motor vehicle, a plurality of transversely extending baffle members in said housing and spaced from the bottom thereof, an air moistening unit in said housing, said unit comprising side plates having spaced wire mesh members in L-shape and extending from one plate to the other forming a pocket, water absorbing material in said pocket, said housing having an open front, a slidable screen closure in said open front, an impeller mounted in the rear of said screen and in advance of said moistening unit, a pump connected to said impeller, said pump including an inlet disposed adjacent the bottom of said tank, said pump having an outlet, a header at the top of said unit and communicating with said outlet, said header having discharge apertures therein, said housing having an outlet.

MEREDITH E. BOWDISH.